Nov. 25, 1952     W. D. SALTER ET AL     2,618,908
PRESSURE REGULATOR WITH INTERENGAGING PISTON AND SEAT INSERT
Filed May 5, 1949     2 SHEETS—SHEET 1
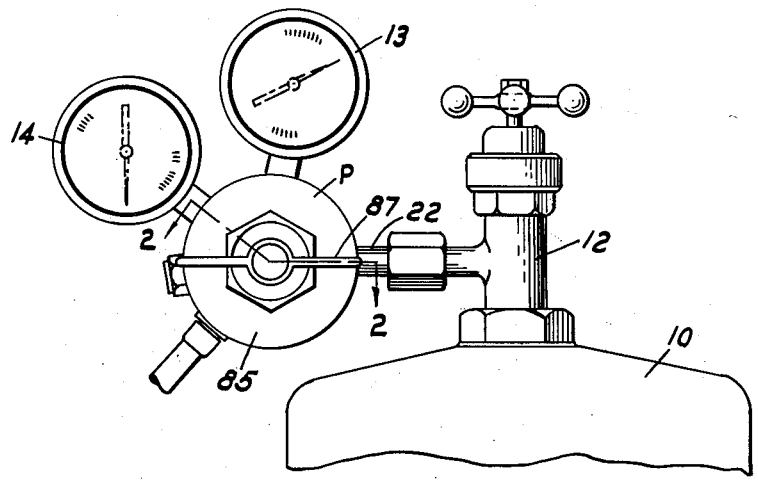
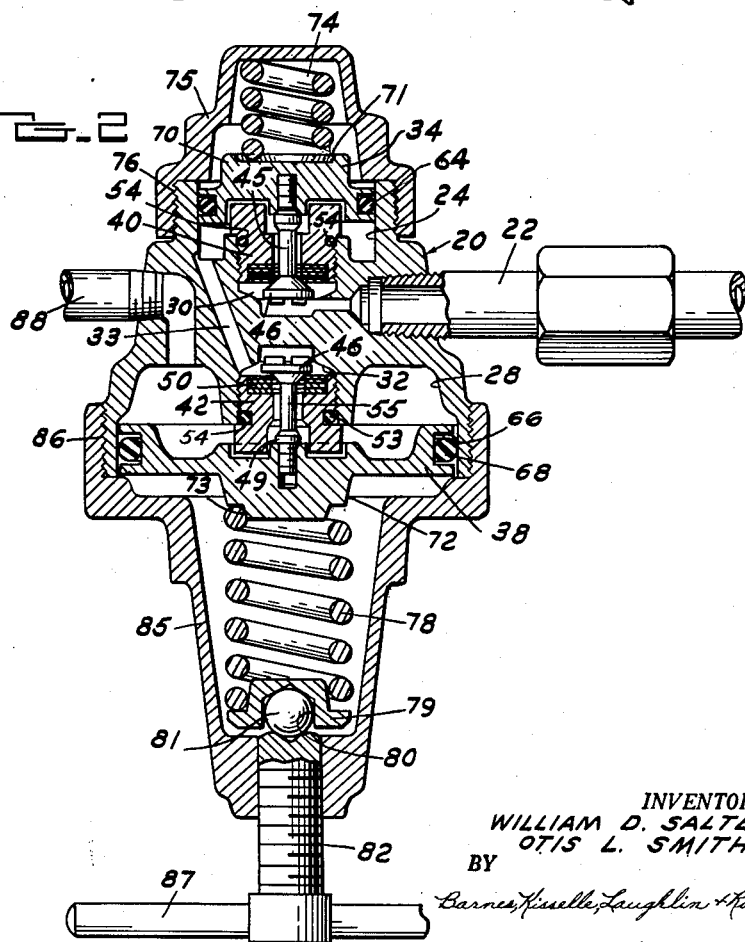
INVENTOR.
WILLIAM D. SALTER
OTIS L. SMITH
BY
Barnes, Kisselle, Laughlin & Raisch
ATTORNEYS Nov. 25, 1952     W. D. SALTER ET AL     2,618,908
PRESSURE REGULATOR WITH INTERENGAGING PISTON AND SEAT INSERT
Filed May 5, 1949     2 SHEETS—SHEET 2
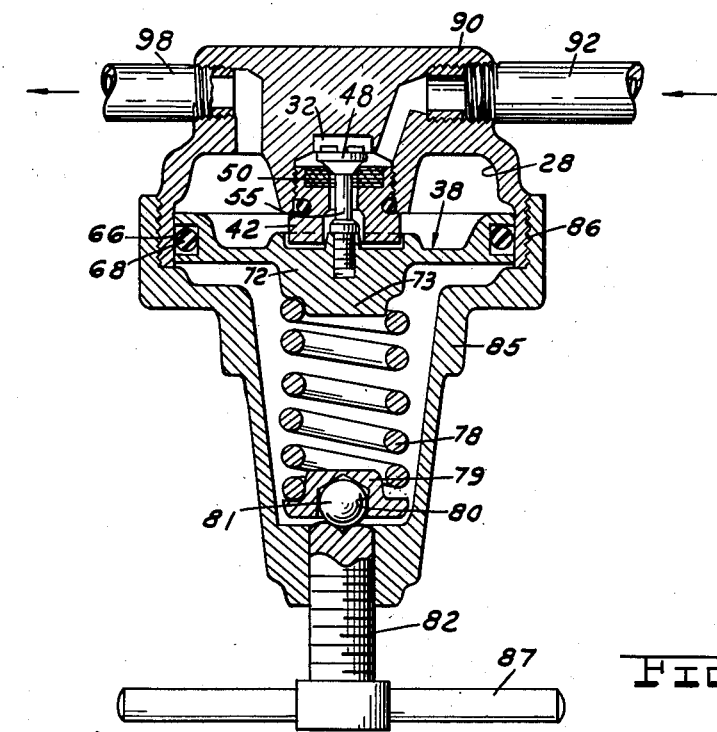
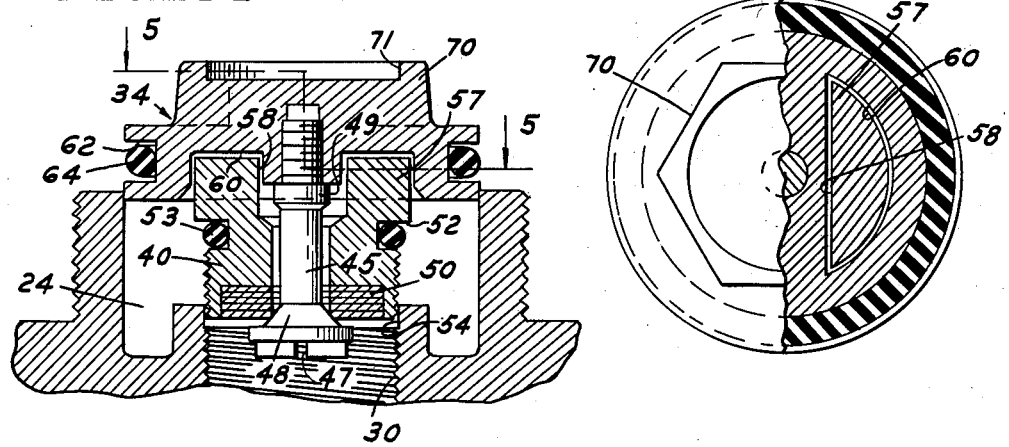
INVENTOR.
WILLIAM D. SALTER
OTIS L. SMITH
BY
Barnes, Kisselle, Laughlin & Raisch
ATTORNEYS Patented Nov. 25, 1952

2,618,908

UNITED STATES PATENT OFFICE 2,618,908

PRESSURE REGULATOR WITH INTER-ENGAGING PISTON AND SEAT INSERT

William D. Salter and Otis L. Smith, Detroit, Mich., assignors to Weldit, Incorporated, Detroit, Mich., a corporation of Michigan Application May 5, 1949, Serial No. 91,592

3 Claims. (Cl. 50—35)

1

This invention relates to a pressure regulator for use particularly in the control of gases. It is an object of the invention to provide a two-stage pressure regulator which may be used, for example, to reduce the pressure of gases used in welding and cutting torches from supply tank pressure to operating pressure. Due to the high pressure in these tanks, it is desirable to reduce this pressure in two stages to gain more accurate control at the final stage.

There are, of course, many other uses for pressure regulation and the design of the present invention will find many applications outside of the welding field. For example, to regulate pressure used in the carbonation of beer and to control oxygen administered for medical purposes.

In the past, it has been customary to use a diaphragm construction for pressure regulation and since there is always a danger of fatigue failure and pinhole leaks in a diaphragm they are always subject to leakage. Other disadvantages of diaphragms are undesirable changes in effective area with deforming, changes in flexibility which requires change in spring adjustment, need for mechanical lost motion in the action, and the vulnerability to shock breakage. It is an object of the present invention to eliminate the use of a diaphragm in the gas pressure regulator, substituting therefor a piston with an O-ring seal. The regulator is so constructed that a very short movement of the piston is required so that there is practically no wear on the O-ring.

Another object of the invention is the provision of a combination piston and seat construction which may be preassembled as a unit prior to the insertion in the regulator housing. During the final assembly, the seat insert is threaded into the housing by applying torque to the piston which causes the piston to enter the housing with a rotating movement and gradual feed, thereby eliminating the possibility of damage to the O-ring contained therein.

Other objects and features of the invention will be described in more detail in the following specification and claims.

Drawings accompany the specification and the various views thereof may be briefly described as:

Figure 1, a view of the top of a gas supply tank showing the two-stage regulator applied thereto.

Figure 2, a sectional view of the regulator on line 2—2 of Figure 1.

Figure 3, a sectional view of a single-stage regulator.

Figure 4, an enlarged view of one end of the two-stage regulator showing details of construction thereof and the manner of assembly.

2

Figure 5, a sectional view on line 5—5 of Figure 4 showing the interlock relationship between the parts.

In the drawings the top of a gas supply tank is shown at 10 fitted with a valve control unit 12 to which is attached the pressure regulator P. Two indicator units 13 and 14 are provided to show respectively, the tank pressure and the final operating pressure due to the pressure reduction. Oxygen is frequently stored at 2,000 lbs. per square inch pressure and will be reduced to a pressure ranging from 200 lbs. per square inch to zero for use particularly in welding work. Acetylene is stored at around 300 lbs. per square inch and reduced to a pressure of 15 lbs. per square inch and less for use in the welding torches and other heating units. Other pressure reduction ranges are possible depending on the end use.

In Figure 2 a sectional view of a two-stage pressure regulator is shown. A main double-ended housing 20 has an inlet 22 from a gas supply tank. In each end of the housing 20 are respectively control chambers 24 and 28, having smooth cylindrical walls. Concentric with these control chambers are inlet chambers 30 and 32 having threaded walls. Control chamber 24 is connected to inlet chamber 32 by a passage 33. Positioned in each control chamber 24 and 28 respectively are pistons 34 and 38 respectively. In each inlet chamber 30 and 32 is a valve seat insert 40 and 42 threaded into the recess. A valve stem 45 is threaded into a piston 34 and the valve stem 55 is threaded into piston 38.

Each valve stem is identical and has an enlarged valve part 46 with a screw driver slot 47 at the end and a tapered section 48 extending outwardly from the stem to serve as the actual valve surface. A shoulder 49 limits the position of the valve stem with respect to the operating piston. This tapered portion 48 of the valve stem co-operates with a circular seat 50 retained in a circular recess in the end of the inserts 40 and 42. These inserts 40 and 42 are identical in construction except that the seats 50 may differ in hardness, depending on the location on the high pressure or the low pressure side, the high pressure side being hard and the low pressure side being softer. The threaded end of the inserts 40 and 42 ends in an annular groove 52 in which is located an O-ring 53 which co-operates with a cylindrical smooth wall 54 at the entrance of the threaded insert chambers 30 and 32 to seal the chambers 30 and 32. Above the O-rings 53 is an enlarged head 51 generally circular in cross-section but provided with a diametrical slot 58 shown particularly well in Figures 4 and 5. The center of the inserts 40 and 42 is bored to provide a gas passageway and also to receive the valve stems 45 and 55.

The pistons 34 and 38 are of similar construction but differ in dimensions and in some details. The inside surface of each piston directly adjacent the valve stem location is provided with recesses 60 which are circular on one side and chordal on the other side to receive the projections of head 57 on the valve seat inserts formed by reason of the slot 58. There is thus an interlock relationship between each piston and its respective insert, which interlock causes the two parts to rotate together but permits relative axial movement within the necessary limits. Piston 34 has an annular groove 62 in which is received an O-ring 64 which serves as a wall seal with the cylindrical operating chamber 24. Piston 38 has an annular groove 66 which receives an O-ring 68 co-operating with the smooth cylindrical wall of the operating chamber 28. Piston 34 has a hexagonal shaped cup projection 70 in the end of which is a spring locating recess 71. Piston 38 has a hexagonal shaped cap projection 72 on the end of which is a circular extension 73 serving as a spring locating means.

A compression spring 74 is seated at one end in the recess 71 and bears at the other end against the inside of the end of a cap 75 which is threaded on the small end of housing 20 at 76. A spring 78 surrounds extension 73 at one end on the piston 38 and at the other end surrounds an extension on a spring locater 79 having a bore recess 80 and a ball 81 which bears against a regulator screw 82 in the end of a cap 85 threaded on the large end of housing 20 at 86. A crossbar 87 is provided with adjusting screw 82 for careful control thereof. Operating chamber 28 has an outlet 88 for the regulated gas going to the consumption unit.

In Figure 3 a single-stage regulator unit is shown, most of the parts of which are identical with the low-pressure stage of the regulator at the large end of Figure 2. A housing 90 has an inlet 92 and an outlet 98 and is provided with the piston chamber 28 and valve insert chamber 32.

In the installation of the regulating members, it will be seen that the pistons, valve seat inserts, and valve stems can be assembled as a unit. The valve head on the valve stems will retain the parts in assembly and they may then be inserted as shown particularly in Figure 4 where the insert 40 is entering the threaded recess 30 as the piston 34 is entering the smooth cylindrical recess 24. It is particularly important during this assembly that the O-ring 64 be undamaged by cutting or scuffing as it enters the recess 24. A turning force applied to the projections 70 on the piston 34 will be transmitted to the valve insert by the interlock relationship previously described so that both parts enter the unit while being turned. As the parts finally reach their operating position, the O-ring 53 will seat in the annular counterbore 54 to provide a static seal and the enlarged head 57 will bear against the end of the threaded recess. At this time the O-ring 64 will have reached its operating position in a gently progressing revolving motion which will cause no injury to the operating surface thereof. The regulation operation will be readily perceivable. Gas enters from the tank pipe 22 to the chamber 30 where it will pass the valve 46 to chamber 24 until the pressure is sufficient to overcome the spring 74. From chamber 24, gas will pass to inlet chamber 32, similarly, until the pressure is such to overcome spring 78. The valves 46 fluctuate back and forth in accordance with the adjustment of the respective springs backing the pistons to give the required pressure setting in each operating chamber. The O-rings used are preferably formed of the oil-resistant type of synthetic rubber.

In the operation the movement of the piston 34 varies within limits of .001 to .004 of an inch. The movement of the larger piston 38 may vary from .002 to approximately .005 of an inch. This movement is very small and not enough to cause material shifting of the O-ring on the cylinder walls, thus the O-rings will last indefinitely without danger of leakage. It will thus be seen that we have provided a pressure regulator construction having many advantages from the point of view of construction and operation, and one in which the overall size even for a two-stage regulator is much less than the average commercial regulator today. In addition, the parts have been reduced in number, and for varying stages many identical parts are possible. Furthermore, the regulator is so designed that the small movement of the parts permits them to last indefinitely without destruction.

What we claim is:

1. A pressure regulator construction comprising a housing having a smooth-walled, circular pressure chamber and a concentric, circular, threaded valve chamber, each chamber having cylindrical walls with co-incident axes, and an inlet and outlet from and to said respective chambers, a flat cylindrical piston member in said pressure chamber having a diameter slightly less than the chamber and provided with an annular recess in the outer walls, an O-ring in said recess having a circular cross-section, a portion of which projects from said recess to contact the walls of the pressure chamber to provide a moving seal, a valve seat insert having threaded walls to be received in the valve chamber, interengaging means non-rotatably and slidably connecting said insert and member for lost motion mutual rotation and for relative axial motion, said chambers being disposed such that when the valve seat insert is screwed into operating position in the valve chamber, the piston member will rotate into operating position in the pressure chamber.

2. A pressure regulator construction comprising a housing having a circular, smooth-walled pressure chamber and a concentric, circular, threaded valve chamber, each chamber having cylindrical walls with co-incident axes, and an inlet and outlet from and to said respective chambers, a flat, cylindrical piston member in said pressure chamber having a diameter slightly less than the chamber and provided with an annular recess in the outer walls, an O-ring of compressible material in said recess having a circular cross-section, a portion of which projects from said recess to contact the walls of the pressure chamber to provide a moving seal, a valve seat insert having threaded walls to be received in the valve chamber and an O-ring of compressible material surrounding said insert adapted to co-operate with the walls of the inlet chamber to provide a static seal, inter-engaging means non-rotatably and slidably connecting said insert and member for lost motion mutual rotation and for relative axial motion, said chambers being disposed such that when the valve seat insert is screwed into operating position in the valve chamber the O-ring in the insert will rotate into static sealing position with the wall of the valve chamber and the piston member will rotate into operating position in the pressure chamber.

3. A device as defined in claim 1 in which the axial length of the valve chamber is at least as great as that of the axial length of the pressure chamber and said parts are arranged that the threads of the valve insert engage the threads of the walls of the valve chamber prior to the time that the O-ring of the piston engages the walls of the pressure chamber.

WILLIAM D. SALTER.
OTIS L. SMITH.

REFERENCES CITED

The following references are of record in the file of this patent:

UNITED STATES PATENTS

| Number | Name | Date |
| --- | --- | --- |
| 483,979 | Foster | Oct. 4, 1892 |
| 749,974 | Synnestvedt | Jan. 19, 1904 |
| 1,069,188 | Saefke | Aug. 5, 1913 |
| 1,800,995 | Gaunt | Apr. 14, 1931 |
| 2,057,150 | Kehl | Oct. 13, 1936 |
| 2,188,850 | Kinkil | Jan. 30, 1940 |
| 2,306,060 | Jacobson | Dec. 22, 1942 |
| 2,487,089 | Anthes | Nov. 8, 1949 |